No. 707,724. Patented Aug. 26, 1902.
A. A. ROSENGRÉN.
AUTOMATIC COUPLING FOR RAILWAY CARS.
(Application filed June 10, 1901.)
(No Model.) 2 Sheets—Sheet 1.
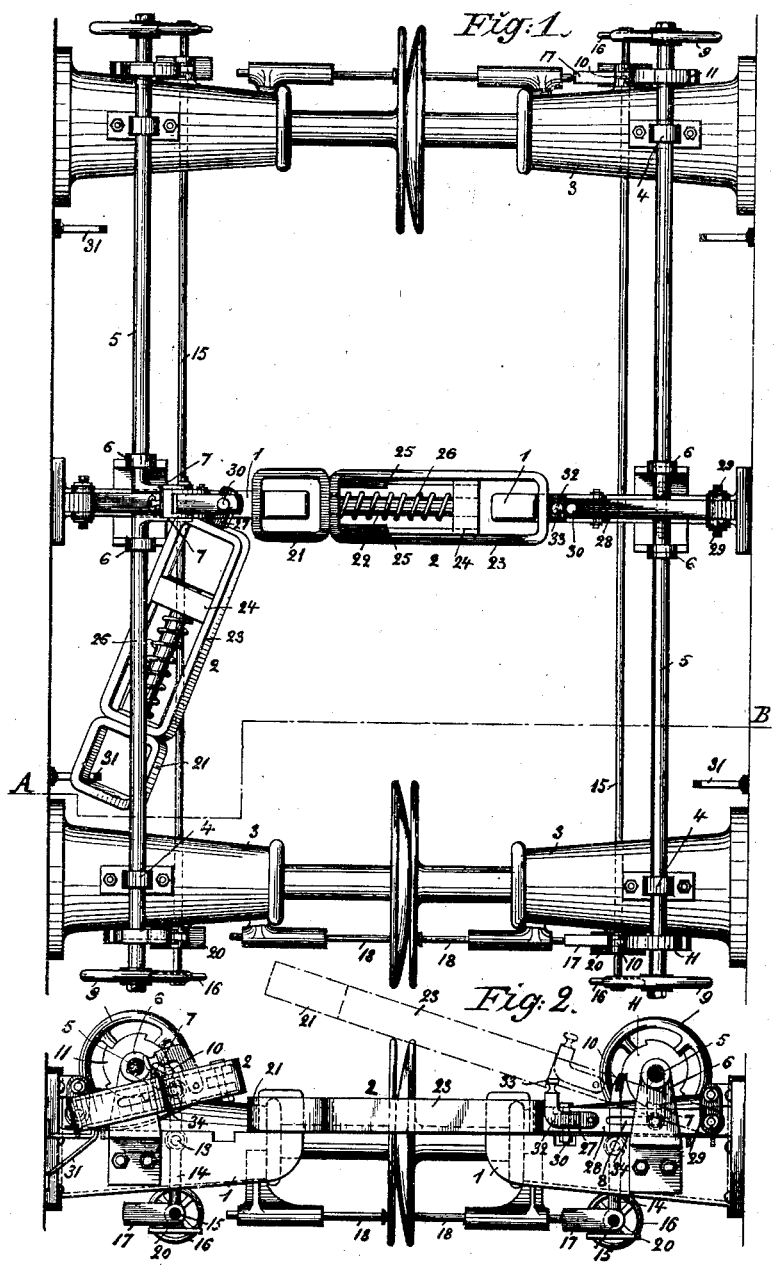
WITNESSES:
Isabella Maldron
Adelaide Claire Gleason
INVENTOR
Anders Andersson Rosengrén
BY Richards Co
ATTORNEYS No. 707,724. Patented Aug. 26, 1902.
A. A. ROSENGRÉN.
AUTOMATIC COUPLING FOR RAILWAY CARS.
(Application filed June 10, 1901.)
(No Model.) 2 Sheets—Sheet 2.
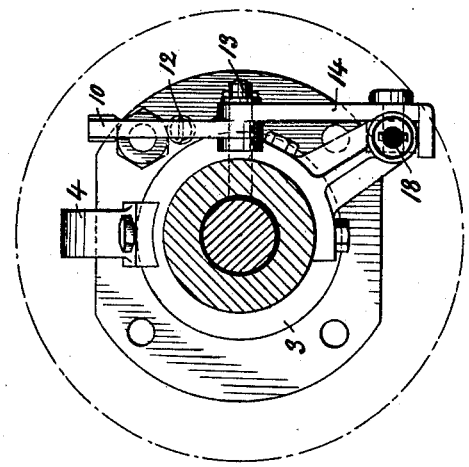
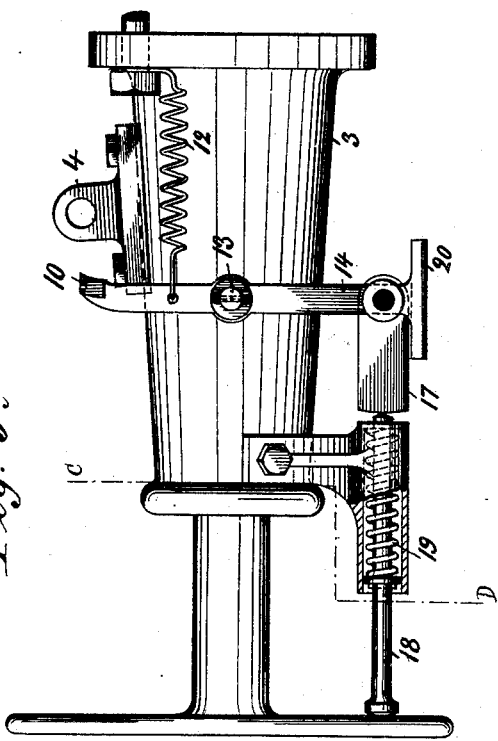
WITNESSES:
Isabella Waldron
Adelaide Claire Gleason
INVENTOR.
Anders Andersson Rosengrén
BY Richards & Co
ATTORNEYS.

UNITED STATES PATENT OFFICE.

ANDERS ANDERSSON ROSENGRÉN, OF MALMÖ, SWEDEN, ASSIGNOR OF ONE-HALF TO PER HANSSON, OF DALKÖPINGS, TRELLEBORG, SWEDEN.

AUTOMATIC COUPLING FOR RAILWAY-CARS.

SPECIFICATION forming part of Letters Patent No. 707,724, dated August 26, 1902.

Application filed June 10, 1901. Serial No. 63,936. (No model.)

*To all whom it may concern:*

Be it known that I, ANDERS ANDERSSON ROSENGRÉN, a subject of the King of Sweden and Norway, and a resident of 11 Kornettgatan, Malmö, in the Kingdom of Sweden, have invented certain new and useful Improvements in Automatic Couplers for Railway-Cars, of which the following is a specification, reference being made to the accompanying drawings.

This invention relates to improvements in such automatic couplers for railway-cars in which the coupling-link of the one of two cars which are to be coupled together is, previous to the coupling operation, kept in a position from which it may enter into engagement with the coupling-hook of the other car in consequence of the buffers being pressed inward when two cars are brought together.
The invention consists in the first instance of ratchet devices combined with the coupling-links and keeping them in the mentioned position, into which the links are swung up by an operation executed outside the buffers, the links being disengaged when the buffers at the bringing together of two cars are pressed inward, in consequence whereof the raised coupling-link is permitted to fall down into engagement with the coupling-hook of the other car. The coupling operation will thus be completely automatic.

The invention has, furthermore, for its object an arrangement or device between the ratchet device of a car and each of the corresponding buffers and which can be readjusted through a simple manipulation carried out by a shunter at the side of the car. In consequence of this operation two cars may push against one another without being coupled together, even if the coupling-link of the one car or the other is adjusted for the coupling operation.

The invention has, finally, for its object some arrangements or devices in couplers carried out as stated above—for instance, in their coupling-links, &c.

The accompanying drawings illustrate couplers constructed according to this invention and mounted on the ends of two railway-cars.
Figure 1 is a plan view of the couplers, and Fig. 2 a section of the same on the line A B in Fig. 1. Fig. 3 illustrates a side view of a buffer with the devices attached to the same, while Fig. 4 is a cross-section of the same.

At each end of a railway-car provided with the coupler in question is a coupling-hook 1, which in Figs. 1 and 2 is shown to be mounted on the buffer-beam, though it may be connected to the frame of the car in any other manner. A coupling-link 2 is pivoted to the buffer-beam at a point above the hook 1, the construction of this link being stated below. The buffer-spring casings 3 carry bearings 4 for a shaft 5, running along the end of the car. This shaft 5, which also rests in supports 6, extending upward from the hook 1, is provided with a double crank 7, the pin of which passes through a slot 8, made in one of the parts of the coupling-link. The ends of the shaft 5, extending beyond the buffers, carry hand-wheels 9, levers, or the like, by means of which the shaft can be operated from the one side of the car or the other in order to adjust the coupling-link into the position shown with dotted lines in Fig. 2. For this adjustment the hand-wheel 9 is turned in such a direction that the pin of the crank 7 acts on the upper side of the slot 8. The coupling-link is kept in said position by means of pawls 10, pivoted to the buffer-spring casings and engaging into ratchet-wheels 11, fixed on the shaft 5 near the hand-wheels 9. The pawls 10 are pressed against the ratchet-wheels 11 by means of spiral springs 12 (see Fig. 3) and are extended below their pivots 13. In these extensions are arranged bearings for a shaft 15, running parallel to the shaft 5 and on its ends which project beyond the buffers provided with hand-wheels 16, handles, or the like, by means of which the shaft 15 can be turned. Near each of the hand-wheels 16 is an arm 17, keyed or otherwise fixed to the shaft 15, which also rests in a hanger attached to the coupling-link. These arms 17 are turned in the same direction and can be caused to occupy different positions by turning the shaft 15. When the arms 17 are swung into the position shown at the right-hand side of Figs. 1 and 2, in which position two cars when brought together are automatically coupled to one another, they are situated in the extension of and reach to bars or pins 18, which are pressed against the buffer-disks by means of springs 19, located in guides fixed to the buffer-spring casings. In order to prevent coupling together of two cars one of which has its coupling-link adjusted for coupling and the buffers of which push against one another, the arms 17 are, by means of one of the hand-wheels 16, corresponding to the said link, swung one-half of a revolution, so that they do not reach to the bars 18, (see the left-hand side of Figs. 1 and 2,) which cannot be pushed inward so far as to hit the extensions 14. In both their positions the arms 17 rest on lugs or projections 20, arranged on the lower ends of the extensions 14.

As mentioned above, the coupling-links are constructed in a special manner. The part of the link intended to engage with the coupling-hook of another car consists of a piece 21 in the shape of a frame, ring, or loop, this piece being provided with a bolt 22, which is directed against the car and extends into a frame-shaped piece 23. On the end of the bolt 22 turned against the car is fixed a die 24, which glides on the longitudinal side pieces of the frame 23, the inner sides of said pieces being for this purpose arranged in a suitable manner. Said sides are provided with shoulders 25, serving as stops for the die 24 and limiting the outward-directed movement of the same when the link is stretched. A spiral spring 26 surrounds the bolt 22 and rests with its ends against the die and the outer end piece of the frame 23, respectively, causing the coupling-loop 21 to rest against the outer end of the frame 23 when the coupler is not exposed to traction. The coupling-hook 1 belonging to a coupler acts, when the coupler is exposed to traction, against the inner end piece of the frame 23 belonging to the same coupler. On this end piece there is a projection or tongue 27, entering into a corresponding recess in the outer end of a bar 28, provided with the above-mentioned slot 8, and the inner end of which is connected to the buffer-beam by means of a double link 29, permitting the inner end piece of the frame 23 to come into contact with the corresponding coupling-hook when the coupling-link is stretched. The frame 23 and the bar 28 are pivotally connected to one another by means of a bolt 30, so that the frame 23 and the coupling-loop 21, carried by the same, can be swung to the one side or the other for being suspended on either of hooks 31, mounted on the buffer-beam on each side of the coupling-hook 1.

In order to keep the frame 23 when the coupler is adjusted for the coupling together of two cars in such a position that the loop 21 of the one car in the moment of the coupling operation will come to surround the coupling-hook of the other car and not to fall on the one or the other side of the same, there is pivotally mounted on the bar 28 a bow 32, the intermediate part of which, extending above said bar, is provided with a button or a handle 33, the bow being arranged in such a manner that the same in its lowered position (see the right portion of Fig. 2) incloses the tongue 27 laterally, so that the link 23 cannot be swung laterally. When the bow 32 is in its raised position, (see the left portion of Fig. 2,) the tongue 27 is free, so that the frame 23, together with the loop 21, can be swung toward the one or the other side for being suspended on either of the hooks 31.

At the upper side of the coupling-hook 1 and at the inner end of the same is fixed a flat spring 34, in the outer end of which is made an aperture, through which passes the bolt 30. This spring serves partly to accelerate the motion of the coupling-link when this falls down into engagement with the coupling-hook and to make said motion more powerful and partly to keep the coupling-link in its lowered position, so as to prevent the same from disengagement with the coupling-hook in consequence of shaking during the run.

The mode of action of the described coupler will be easily understood. When two cars are to be coupled together, the coupling-link of the one car is swung to the raised position, (shown with dotted lines in Fig. 2,) in which position it is retained by the pawls 10 and the ratchet-wheels 11, while the opposite coupling-link of the other car is suspended on either of the corresponding hooks 31. Moreover, the arms 17 of the coupler, the coupling-link of which is raised, are thrown into the position shown in the right part of Fig. 2.

The adjustment of the coupling-link 2 and the arms 17 can, as will be seen from the above, be carried out from outside the buffers, so that a shunter need not enter between the buffers for either of these operations. He must, however, enter between the buffers when a coupling-link is to be swung inward or outward, but this operation need, especially under the observance of a rule concerning the position of the coupling-links, only seldom be made, and can be made when no danger is at hand.

When a car, the coupling-link of which is raised in the same time as the arms 17 of the same car occupy the position for coupling, is brought together with another car, the opposite coupling-link of which is swung aside, (the arms 17 of this car should be in the position shown in the left portion of Fig. 2,) their buffer-disks are pressed inward, so that the bars 18 of the first-mentioned car act on the corresponding arms 17, thereby causing the pawls 10 to be turned so that they come out of engagement with the ratchet-wheels 11. The coupling-link thus disengaged swings downward, influenced by the spring 34, whereby the coupling-loop 21 of the link is brought to surround the upward-directed part of the coupling-hook of the other car in the same time as the inner portion of the descending frame 23 moves down around the coupling-hook of the corresponding car. The cars are thus coupled together, and when the coupler is exposed to traction the tractive force is transmitted through the coupling-link—viz., from the one coupling-hook to the loop 21—through the bolt 22 of the same and the die 24, carried by the bolt and resting against the shoulders 25 (and partly through the spiral spring 26, which, however, may not be completely compressed when the die rests against the shoulders) to the frame 23 and from thence to the other hook, or vice versa.

Uncoupling of two cars is executed from outside the buffers by actuating either of the hand-wheels 9 (or levers) corresponding to a coupling-link in action, so as to swing this link upward. As the pawls 10 are at this operation caused to engage into their ratchet-wheels 11, the coupler is again adjusted for the coupling together of two cars. If a coupling together of two cars which push against one another is not desired, the arms 17 are, as mentioned above, readjusted by turning the shaft 15. This operation may also be executed from outside the buffers.

It is evident that the described coupler may be modified in several manners while possessing the characteristic features of this invention. For instance, the device for disengaging the ratchet arrangement may be carried out otherwise than in the manner described.

Couplers for railway-cars have previous to this invention been provided with shafts running along the ends of the cars and have had on their ends, which reach to the sides of the cars, manipulatory devices, (hand-wheels, levers, or the like,) wherefore I do not claim this arrangement in itself.

Having now described my invention, what I claim as new, and desire to secure by Letters Patent, is—

1. In a car-coupler, the combination with a hook and a link, one of said parts being rigid and the other pivoted, of means for elevating said pivoted part, pawl-and-ratchet devices for holding it raised, sliding rods designed to be operated by the buffer-heads, and adjustable members or arms connected to the pawls and designed to be adjusted or moved into or out of the path of the sliding rods, substantially as described.

2. In a car-coupler, the combination with a hook and a link, one of said parts being rigid and the other pivoted, of means for elevating said pivoted part, pawl-and-ratchet devices for holding it raised, sliding rods designed to be operated by the buffer-heads, and adjustable members or arms connected to the pawls and designed to be adjusted or moved into or out of the path of the sliding rods and a transverse shaft carrying the adjustable members or arms whereby the arms at each side of the car may be simultaneously adjusted from one side of the car, substantially as described.

3. In a car-coupler, a hook carried by one car, a link carried by the other, one of said parts being pivoted, a rock-shaft having connections for operating said pivoted part, a ratchet device on said shaft, a pawl engaging said ratchet device, a second rock-shaft journaled in the ends of said pawls, contact-arms carried by said second shaft, and sliding rods arranged to partake of the movement of the buffers, said contact-arms being arranged to be thrown into or out of the paths of the sliding rods by the rotation of said second shaft, substantially as described.

4. In a car-coupler, a hook carried by one car, a link carried by the other, one of said parts being pivoted, a rock-shaft having connections for operating said pivoted part, a ratchet-wheel on said shaft, a pawl engaging said ratchet-wheel, a second rock-shaft journaled in the lower ends of said pawls, contact-arms carried by said second shaft, and sliding rods arranged to partake of the movement of the buffers, said contact-arms being arranged to be thrown into or out of the paths of the slidings rods, and lugs for supporting said arms in either position, substantially as described.

5. In a car-coupler, the combination with the pivotally-supported coupling-link having a transversely-hinging portion or shank 27, of a bow 32 for engaging the same for preventing transverse swinging, substantially as described.

6. In a hook-and-link car-coupler, the combination with the buffer-beam of a coupling-link, and a double link 29 pivotally connecting said link to said beam, substantially as described.

In witness whereof I have hereunto set my hand in presence of two witnesses.

ANDERS ANDERSSON ROSENGRÉN.

Witnesses:
H. B. OHISSON,
CARL TH. SUNDHOLM.